United States Patent
Tachi et al.

(10) Patent No.: US 9,979,176 B2
(45) Date of Patent: May 22, 2018

(54) MOLDED PART-EQUIPPED ELECTRICAL CABLE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kentaro Tachi, Mie (JP); Kouji Fukumoto, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days. days.

(21) Appl. No.: 15/521,945

(22) PCT Filed: Nov. 13, 2015

(86) PCT No.: PCT/JP2015/081975
§ 371 (c)(1),
(2) Date: Apr. 26, 2017

(87) PCT Pub. No.: WO2016/080304
PCT Pub. Date: May 26, 2016

(65) Prior Publication Data
US 2017/0324235 A1    Nov. 9, 2017

(30) Foreign Application Priority Data

Nov. 19, 2014    (JP) .................................. 2014-234212

(51) Int. Cl.
H02G 15/00     (2006.01)
H02G 15/02     (2006.01)
(Continued)

(52) U.S. Cl.
CPC ............... *H02G 15/02* (2013.01); *H01B 3/28* (2013.01); *H01B 7/02* (2013.01); *H01B 7/282* (2013.01); *H01R 11/12* (2013.01); *H02G 1/14* (2013.01)

(58) Field of Classification Search
CPC ... H01B 3/00; H01B 3/28; H01B 7/00; H01B 7/02; H01B 7/04; H01B 7/1282;
(Continued)

(56) References Cited

U.S. PATENT DOCUMENTS 2,939,905 A * 6/1960 Canfield .................. H01B 7/04
                                                174/113 C
5,644,189 A * 7/1997 Busby ...................... H01K 1/44
                                                313/318.01

(Continued)

FOREIGN PATENT DOCUMENTS

JP    10-132124    5/1998
JP    2002-315130    10/2002
(Continued)

OTHER PUBLICATIONS

International Search Report dated Feb. 16, 2016.

*Primary Examiner* — William H Mayo, III
(74) *Attorney, Agent, or Firm* — Gerald E. Hespos; Michael J. Porco; Matthew T. Hespos (57) ABSTRACT

The molded part-equipped electrical cable is provided with a terminal-equipped electrical cable including an insulated electrical cable with a core and an insulation coating and a terminal connected to an end part of the insulated electrical cable, a recess being formed on the insulation coating, an (Continued)

adhesive provided in the recess of the insulation coating, and a molded part configured to cover from a part where the adhesive is provided in the insulation coating of the terminal-equipped electrical cable to a connected part of the insulated electrical cable and the terminal.

8 Claims, 4 Drawing Sheets

(51) Int. Cl.
  *H01B 3/28* (2006.01)
  *H01B 7/02* (2006.01)
  *H02G 1/14* (2006.01)
  *H01B 7/282* (2006.01)
  *H01R 11/12* (2006.01)
(58) Field of Classification Search
  CPC .......... H01B 11/00; H01B 11/12; H02G 1/00; H02G 1/14; H02G 15/00; H02G 15/02
  USPC ... 174/110 R, 112, 74 R, 78, 84 R, 88 R, 92, 174/93
  See application file for complete search history.

(56) References Cited

U.S. PATENT DOCUMENTS

| | | | |
|---|---|---|---|
| 2010/0120072 A1* | 5/2010 | Lorence | G01N 33/57415 435/7.23 |
| 2011/0045697 A1* | 2/2011 | Sawamura | B60R 16/0207 439/587 |

FOREIGN PATENT DOCUMENTS

| | | |
|---|---|---|
| JP | 2006-123458 | 5/2006 |
| JP | 2012-54143 | 3/2012 |
| JP | 2013-131446 | 7/2013 |

\* cited by examiner

MOLDED PART-EQUIPPED ELECTRICAL CABLE

BACKGROUND

1. Field of the Invention

The invention relates to a molded part-equipped electrical cable including a terminal-equipped electrical cable and a molded part.

2. Description of the Related Art

A terminal-equipped electrical cable of a wiring harness that is installed in a vehicle includes an insulated electrical cable and a terminal connected to an end part of the insulated electrical cable. The insulated electrical cable includes a core and an insulation coating covering the core.

Japanese Unexamined Patent Publication No. 2002-315130 discloses a terminal-equipped electrical cable that includes a molded part. The molded part covers an end part of an insulated electrical cable and a part of a terminal of the terminal-equipped electrical cable. The terminal-equipped electrical cable including the molded part is referred to herein as a molded part-equipped electrical cable.

An adhesive may be provided on a surface of the insulation coating to improve an adhesive force between the molded part and the insulation coating of the insulated electrical cable. Further, Japanese Unexamined Patent Publication No. 2006-123458 discloses performing a plasma discharge treatment at a position of an insulated electrical cable where a molded part is formed, and an adhesive is applied at the position where this treatment is performed. The plasma discharge treatment improves an adhesive force between the adhesive and the insulation coating.

The adhesive applied to the insulation coating may be caused to flow from a desired position by an injection pressure applied during the molding of the molded part.

Further, in the case of employing the example shown in Japanese Unexamined Patent Publication No. 2006-123458 to improve the adhesive force between the insulation coating and the adhesive, it is difficult to visually judge an improvement of the insulation coating before and after the plasma discharge treatment. In this case, molding may be performed in a state where the property modification of the insulation coating is insufficient.

The present invention aims to more reliably suppress the flow of an adhesive from a desired position by an injection pressure applied during the molding of a molded part in a molded part-equipped electrical cable.

SUMMARY

A molded part-equipped electrical cable according to this disclosure is provided with a terminal-equipped electrical cable including an insulated electrical cable with a core and an insulation coating covering around the core and a terminal connected to an end part of the insulated electrical cable. A recess is formed on the insulation coating, and an adhesive provided in the recess of the insulation coating. A molded part is configured to cover from a part where the adhesive is provided in the insulation coating of the terminal-equipped electrical cable to a connected part of the insulated electrical cable and the terminal.

The recess may include a first recess formed on the insulation coating along a circumferential direction of the insulated electrical cable. The application of the adhesive in an area along the circumferential direction of the insulated electrical cable can improve the performance of a waterproof structure of the molded part-equipped electrical cable.

The insulation coating may be made of silicone rubber. Silicone rubber is poor in adhesion to adhesive in many cases. Thus, the molded part-equipped electrical cable of the third aspect is more effective.

The recess may be formed by applying an organic solvent to the insulation coating. Thus, the recess can be formed easily.

An end of the recess may be located closer to a middle side than an end of the insulation coating in a longitudinal direction of the insulated electrical cable. Thus, the adhesive is not likely to flow up from the recess by the injection pressure during the molding of the molded part. In this way, the flow of the adhesive from the desired position by the injection pressure during the molding of the molded part is suppressed.

The recess may include a plurality of second recesses scattered on the insulation coating. Thus, the adhesive is less likely to flow and the flow of the adhesive from the desired position by the injection pressure during the molding of the molded part can be suppressed.

As described above, the adhesive is provided in the recess formed on the insulation coating. Thus, the adhesive easily is pooled in the recess and the flow of the adhesive from a desired position by an injection pressure during the molding of the molded part is suppressed. Further, a state where an adhesive force between the insulation coating and the adhesive is improved can be confirmed more reliably by providing the recess on the insulation coating. Thus, the flow of the adhesive from the desired position by the injection pressure during the molding of the molded part can be suppressed more reliably.

DETAILED DESCRIPTION

Hereinafter, embodiments are described with reference to the accompanying drawings. The following embodiments are specific examples of the present invention and do not limit the technical scope of the present invention.

With reference to FIGS. 1 to 8, a molded part-equipped electrical cable 100 according to a first embodiment is described. The molded part-equipped electrical cable 100 includes a terminal-equipped electrical cable 1, an adhesive 2 and a molded part 3. The terminal-equipped electrical cable 1 includes an insulated electrical cable 11 and a terminal 12.

Figure 1:
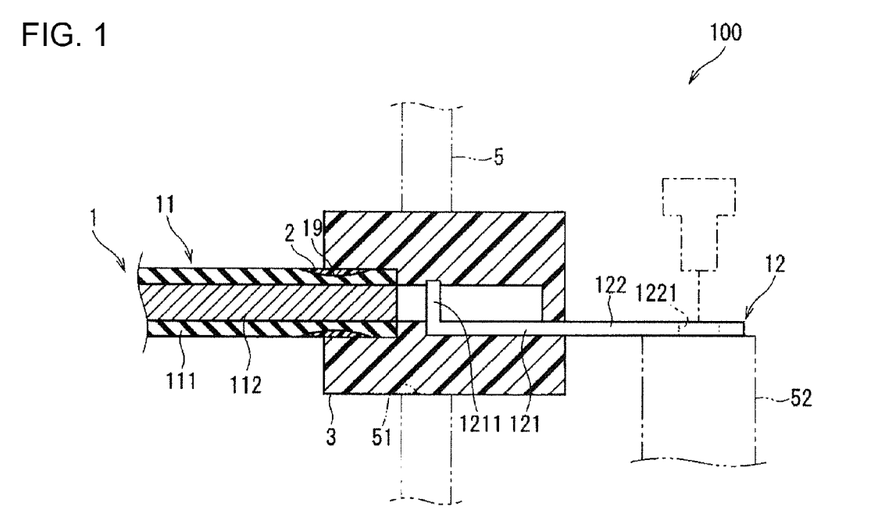
FIG. 1 is a side view partly in section of a molded part-equipped electrical cable according to a first embodiment.
Figure 2:
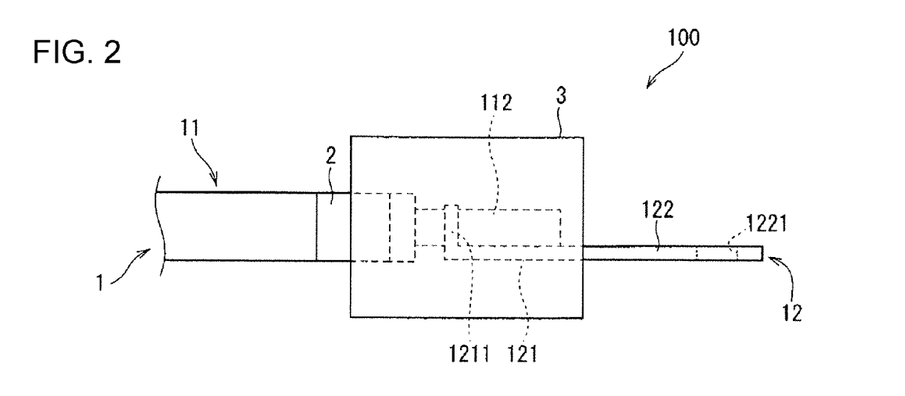
FIG. 2 is a side view of the molded part-equipped electrical cable according to the first embodiment.

FIG. 1 is a side view partly in section of the molded part-equipped electrical cable 100 where the inside of the molded part 3 and the inside of a part of the insulated electrical cable 11 are shown in section. FIG. 2 is a side view of the molded part-equipped electrical cable 100.

The molded part-equipped electrical cable 100 constitutes a part of a wiring harness to be installed in a vehicle such as an automotive vehicle. In this embodiment, the molded part-equipped electrical cable 100 is to be inserted into an opening 51 of a casing 5, such as a shield shell, and is connected to a mating member 52, such as a terminal block provided in the casing 5. At this time, the molded part 3 of the molded part-equipped electrical cable 100 is fit into the opening 51 of the casing 5, thereby positioning the molded part-equipped electrical cable 100. Note that, in FIG. 1, the casing 5, the opening 51 and the mating member 52 are shown by virtual lines (chain double-dashed lines).

<Molded Part-Equipped Electrical Cable: Terminal-Equipped Electrical Cable>

The terminal-equipped electrical cable of the molded part-equipped electrical cable 100 includes the insulated electrical cable 11 and the terminal 12. The insulated electrical cable 11 includes a core 112 and an insulation coating 111 covering the core 112. The core 112 may comprise a metal, such as copper or aluminum. The insulation coating 111 is an insulating resin.

In the present embodiment, the insulation coating 111 is formed of silicone rubber. Silicone rubber is generally known as a material that hard to adhere. Note that the insulation coating 111 also may be a hard to adhere material, such as fluororesin. The insulation coating 111 also may be a synthetic resin member mainly containing polyethylene or vinyl chloride.

The insulation coating 111 is formed with a recess 19, and the adhesive 2 is provided in the recess 19, as described in detail later.

The terminal 12 is connected to an end part of the insulated electrical cable 11 and includes an electrical cable connecting portion 121 and a mating member connecting portion 122. The terminal 12 may be formed from metal, such as copper.

The electrical cable connecting portion 121 includes a crimping piece 1211 that is crimped to the core 112 extending from the insulation coating 111 of the insulated electrical cable 11. Note that the electrical cable connecting portion 121 also may include a crimping piece to be connected to the insulation coating 111 at an end part of the insulated electrical cable 11. Further, the core 112 of the insulated electrical cable 11 may be connected to the electrical cable connecting portion 121 of the terminal 12 by welding, such as thermal welding or ultrasonic welding.

The mating member connecting portion 122 is connectable to the mating member 52. In this embodiment, the mating member connecting portion 122 is formed with a hole 1221 enabling the mating member connecting portion 122 to be bolted to the mating member 52 (terminal block).

<Molded Part-Equipped Electrical Cable: Adhesive>

The adhesive 2 is provided o fill up the recess 19 of the insulation coating 111 of the insulated electrical cable 11, as shown in FIGS. 1 and 2.

The adhesive 2 is formed, for example, of a resin material, such as a silicone-based resin material. The adhesive 2 adheres to the insulation coating 111 to fill up a clearance between the molded part 3 to be described later and the insulation coating 111, thereby forming a waterproof structure of the molded part-equipped electrical cable 100. Since silicone rubber is employed as the insulation coating 111 in this embodiment, adhesion between the molded part 3 and the insulation coating 111 is poor. Thus, the adhesive 2 is used to improve the performance of the waterproof structure of the molded part-equipped electrical cable 100. Specifically, adhesion between the adhesive 2 and the insulation coating 111 or adhesion between the adhesive 2 and molding resin of the molded part 3 is thought to be better than adhesion between the resin of the insulation coating 111 and the molding resin of the molded part 3 to be described later. The adhesive 2 containing a resin material satisfying this condition is possibly employed.

<Molded Part-Equipped Electrical Cable: Molded Part>

The molded part 3 covers from a part where the adhesive 2 is provided in the insulation coating 111 of the terminal-equipped electrical cable 1 to a connected part of the insulated electrical cable 11 and the terminal 12. Specifically, the molded part 3 covers the connected part of the insulated electrical cable 11 and the terminal 12 and constitutes the waterproof structure of the molded part-equipped electrical cable 100.

The molded part 3 also includes a part covering the adhesive 2 provided in the recess 19 of the insulation coating 111. Thus, the molded part 3 is formed into an annular shape covering from the part where the adhesive 2 is provided in the insulation coating 111 of the terminal-equipped electrical cable 1 to the connected part of the insulated electrical cable 11 and the terminal 12.

Further, a contour shape of the molded part 3 is such that the molded part 3 can fit into the opening 51. Note that, depending on the shape of the opening 51 of the casing 5, the outer peripheral surface of the molded part 3 may be formed with a protrusion or a recess fittable to the opening 51.

The molded part 3 covers the adhesive 2 over the entire circumference in a circumferential direction of the insulated electrical cable 11. Further, the molded part 3 covers a part of the adhesive 2 in a longitudinal direction of the insulated electrical cable 11. Additionally, a part of the adhesive 2 is exposed without being covered by the molded part 3. Note that the molded part 3 also may be formed to cover the entire adhesive 2.

The resin forming the molded part 3 may be PPS (polyphenylene sulfide) resin, PPA (polyphthalamide) resin, LCP (liquid crystal polymer) resin, phenol-, polyester-, polyamide- or epoxy-based resin, PBT (polybutylene terephthalate) resin or the like.

<Molded Part-Equipped Electrical Cable: Recess>

Figure 3:
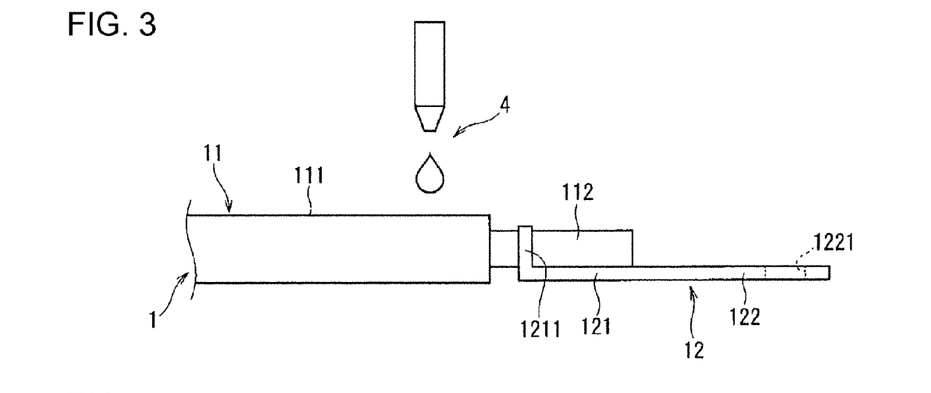
FIG. 3 is a side view showing a state where an organic solvent is dripped onto a terminal-equipped electrical cable in the first embodiment.
Figure 4:
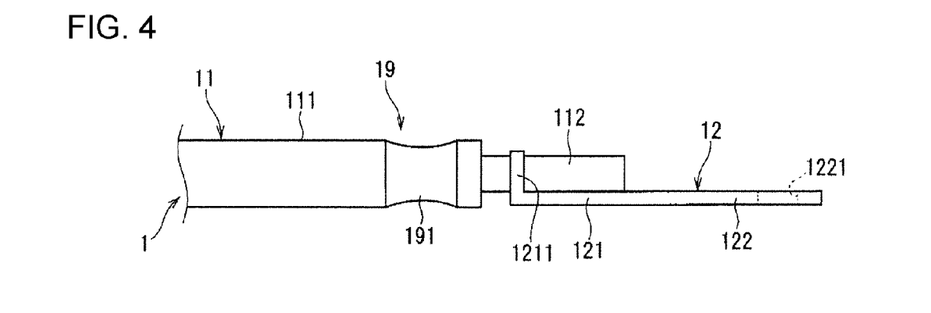
FIG. 4 is a side view of the terminal-equipped electrical cable formed with a recess in the first embodiment.
Figure 5:
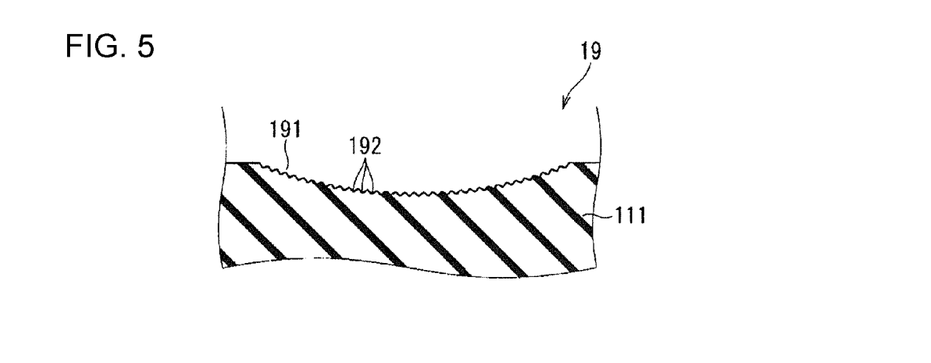
FIG. 5 is a section enlargedly showing the recess in the first embodiment.

Next, the structure of the recess 19 formed on the insulation coating 111 in the molded part-equipped electrical cable 100 is described with reference to FIGS. 3 to 5. FIG. 3 is a view showing an example of an operation of forming the recess 19. Note that, in this embodiment, the recess 19 is formed by supplying an organic solvent 4 to the insulation coating 111. Thus, FIG. 3 shows a state of the operation of forming the recess 19 by supplying the organic solvent 4 to the insulation coating 111. FIG. 4 is a side view of the terminal-equipped electrical cable 1 including the recess 19 before the adhesive 2 is provided. FIG. 5 is an enlarged section of the recess 19. Note that a cross-section in a plane extending along the longitudinal direction of the insulated electrical cable 11 is shown in FIG. 5.

The recess 19 formed on the insulation coating 111 is provided to suppress a movement of the adhesive 2 to flow on the outer peripheral surface of the insulation coating 111. The recess 19 extends from the side of the outer peripheral surface of the insulation coating 111 of the insulated electrical cable 11 toward the side of the core 112 in the insulation coating 111.

In this embodiment, the recess 19 is formed on an end part of the insulation coating 111. Further, in this embodiment, the recess 19 is formed on the insulation coating 111 so that an end of the recess 19 in the longitudinal direction of the insulated electrical cable 11 is closer to a middle part than an end of the insulation coating 111. Note that a middle of the insulation coating 111 means a part between both ends of the insulation coating 111 in the longitudinal direction of the insulated electrical cable 11. Thus, the middle part of the insulation coating 111 can also be a part of the end of the insulation coating 111 opposite to the terminal 12 in the longitudinal direction of the insulated electrical cable 11.

A part not recessed without having the organic solvent 4 applied thereto is present on a side of the recess 19 toward the terminal 12 in the longitudinal direction of the insulated electrical cable 11. Thus, the recess 19 can, for example, be a recess not including an end surface of the insulation coating 111. Note that the end surface of the insulation coating 111 is perpendicular to the longitudinal direction of the insulated electrical cable 11 and is located on a base end side of the core 112 to be connected to the terminal 12 in the insulation coating 111.

The recess 19 includes a first recess 191 formed on the insulation coating 111 along the circumferential direction of the insulated electrical cable 11 and a plurality of second recesses 192 scattered on the insulation coating 111.

The first recess 191 is formed over the entire circumference of the insulation coating 111 along the circumferential direction of the insulated electrical cable 11, as shown in FIGS. 1 and 4. Note that the first recess 191 also may be formed in a part in the circumferential direction of the insulation coating 111.

In this embodiment, the second recesses 192 are formed on the surface of the insulation coating 111 in the first recess 191. Specifically, the second recesses 192 are scattered in the first recess 191. Thus, the first recess 191 has an uneven surface by forming the second recesses 192 in the first recess 191, as shown in FIG. 5.

In this embodiment, the recess 19 is formed by dripping the organic solvent 4 on the insulation coating 111. The organic solvent 4 may be a strong acid solvent. In this embodiment, the organic solvent 4 contains an organic compound having a property of melting the insulation coating 111 (silicone rubber). The organic solvent 4, for example, ma contain a dilute sulfuric acid. The recess 19, for example, may be formed by the method described below.

First, as shown in FIG. 3, the organic solvent 4 is dripped to a predetermined position of the insulation coating 111. Then, the insulation coating 111 is melted at the position where the organic solvent 4 was dripped, thereby being recessed toward the side of the core 112 as compared to other positions of the insulation coating 111 where the organic solvent 4 was not dripped. In this way, the recess 19 including the first recess 191 and the second recesses 192 is formed.

Specifically, the organic solvent 4 dripped to the insulation coating 111 moves on the outer peripheral surface of the insulation coating 111 along the circumferential direction of the insulated electrical cable 11. In this way, the first recess 191 extending along the circumferential direction of the insulated electrical cable 11 is formed. In this embodiment, the first recess 191 is formed over the entire circumference of the insulation coating 111. Further, the organic solvent 4 also may be dripped to the predetermined position of the insulation coating 111 while the insulated electrical cable 11 is rotated in the circumferential direction.

Further, the organic solvent 4 dripped to the insulation coating 111 melts a surrounding part to expand from the dripped position. The organic solvent 4 generally has a high volatility. Thus, with distance from the dripped position of the organic solvent 4, the amount of the organic solvent 4 for melting the insulation coating 111 gradually decreases. Thus, the recess 19 has a recessed dimension toward the core 112 that becomes gradually shallower toward both sides from a position most recessed toward the core 112 in the longitudinal direction of the insulated electrical cable 11. The position of the recess 19 most recessed toward the core 112 corresponds to the dripped position of the organic solvent 4.

The recess 19 formed by dripping the organic solvent 4 includes the plurality of second recesses 192 scattered in the first recess 191. As shown in FIG. 5, the second recesses 192 are formed on the surface of the insulation coating 111 in the first recess 191 so that the surface forming the first recess 191 is uneven and roughened by the organic solvent 4. The adhesive 2 is easily pooled in the recess 19 by the plurality of second recesses 192 provided in the first recess 191.

Note that the recess 19 may also be formed on the insulation coating 111 by applying the organic solvent 4 to the insulation coating 111 instead of dripping the organic solvent 4. Further, the organic solvent 4 may be removed from the insulation coating 111 by washing the insulated electrical cable 11 together with the organic solvent 4 without waiting for the volatilization of the organic solvent 4.

Figure 6:
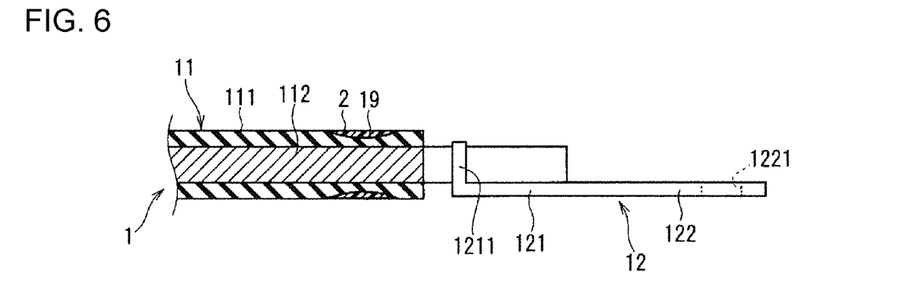
FIG. 6 is a side view partly in section of the terminal-equipped electrical cable provided with an adhesive in the first embodiment.
Figure 7:
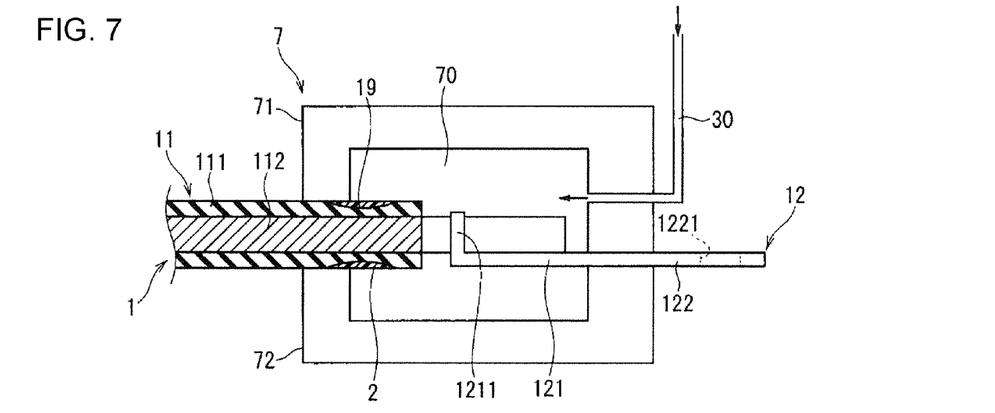
FIG. 7 is a side view partly in section showing a state of providing a molded part in the first embodiment.
Figure 8:
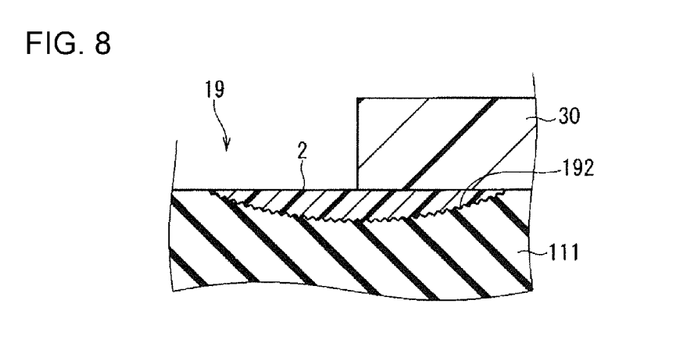
FIG. 8 is a section enlargedly showing a recess during the molding of the molded part in the first embodiment.

Next, functions of the recess 19 formed on the insulation coating 111 in the molded part-equipped electrical cable 100 are described further with reference to FIGS. 6 to 8. FIG. 6 is a side view partly in section of the terminal-equipped electrical cable 11 with the adhesive 2 provided in the recess 19. FIG. 7 is a view showing molding for providing the molded part 3 on the terminal-equipped electrical cable 1. FIG. 8 is an enlarged section enlargedly showing the vicinity of the recess 19 during molding. Note that a cross-section in a plane extending along the longitudinal direction of the insulated electrical cable 11 is shown in FIG. 8.

After the recess 19 is formed on the insulation coating 111, the adhesive 2 is provided in the recess 19. More specifically, the adhesive 2 is provided to fill up the first recess 191 of the recess 19. After the adhesive 2 is dried, this terminal-equipped electrical cable 1 is set in a mold 7.

As shown in FIG. 7, the mold 7 includes an upper mold 71 and a lower mold 72. The upper and lower molds 71, 72 are movable away from and toward each other. Further, a molding space 70 is formed in the mold 7 with the upper and lower molds 71, 72 located closest to each other. The molding space 70 is enclosed by a mold surface having the same contour shape as the outer peripheral surface of the molded part 3. In this embodiment, the insulation coating 111 of the terminal-equipped electrical cable 1 is accommodated in the molding space 70 from the part where the adhesive 2 is provided in the insulation coating 111 of the terminal-equipped electrical cable 1 to the connected part of the insulated electrical cable 11 and the terminal 12.

After the terminal-equipped electrical cable 1 is set in the mold 7, molding resin 30 for forming the molded part 3 is injected into the molding space 70 of the mold 7 and fills up the molding space 70.

As shown in FIG. 8, the molding resin 30 moves to slide on the outer peripheral surface of the insulation coating 111 by an injection pressure thereof. However, the adhesive 2 is provided in the recess 19 of the insulation coating 111 in this embodiment. Thus, the flow of the adhesive 2 to be separate from the insulation coating 111 is suppressed by the molding resin 30 moving on the outer peripheral surface of the insulation coating 111.

Further, if a contour formed by the outer peripheral surface of the adhesive 2 provided in the recess 19 is the same as or smaller than the contours formed by the outer peripheral surfaces of areas of the insulation coating 111 at opposite sides of the recess 19 in the longitudinal direction of the insulated electrical cable 11, i.e. of areas not recessed toward the core 112 in the insulation coating 111 will cause the molding resin 30 to move on the outer peripheral surface of the insulation coating 111 and will further suppress the suppress the separation of the adhesive 2 from the insulation coating 111. Note that a case where the contour formed by the outer peripheral surface of the adhesive 2 provided in the recess 19 and those formed by the outer peripheral surfaces of the areas of the insulation coating 111 at the opposite sides of the recess 19 in the longitudinal direction of the insulated electrical cable 11, i.e. of the areas not recessed toward the core 112 in the insulation coating 111 are the same is also a case where there are no steps between the adhesive 2 in the recess 19 and the areas of the insulation coating 111 at the opposite sides of the recess 19 in the longitudinal direction of the insulated electrical cable 11.

The end of the recess 19 is closer to the middle part than the end of the insulation coating 111 in the longitudinal direction of the insulated electrical cable 11. Thus, the adhesive 2 is not likely to flow to be pushed up from the recess 19 by the injection pressure during the molding of the molded part 3. As a result, the flow of the adhesive 2 from a desired position of the insulation coating 111 can be suppressed more.

Further, the recess 19 includes the second recesses 192 in this embodiment. Thus, the adhesive 2 is less likely to flow from the recess 19 and the flow of the adhesive 2 from the desired position by the injection pressure during the molding of the molded part 3 is suppressed more.

<Molded Part-Equipped Electrical Cable>

The molding resin 30 is cured in a state covering around the adhesive 2, thereby forming the molded part 3 covering from the part where the adhesive 2 is provided in the insulation coating 111 of the terminal-equipped electrical cable 1 to the connected part of the insulated electrical cable 11 and the terminal 12. The molded part-equipped electrical cable 100 is obtained by taking the terminal-equipped electrical cable 1 with the molded part 3 out of the mold 7.

The flow of the adhesive 2 from the desired position of the insulation coating 111 can be suppressed in this embodiment. Thus, a clearance between the molded part 3 and the insulation coating 111 can be filled up more reliably with the adhesive 2.

Further, in the manufacturing of the molded part-equipped electrical cable 100, the recess 19 formed on the insulation coating 111 easily can be confirmed visually. Thus, the flow of the adhesive 2 from the desired position by the injection pressure during the molding of the molded part 3 can be suppressed more reliably. As a result, the performance of the waterproof structure of the molded part-equipped electrical cable 100 is improved.

Further the flow of the adhesive 2 from the desired position by the injection pressure during the molding of the molded part 3 can be suppressed by a simple configuration to provide the recess 19 on the insulation coating 111.

The recess 19 is formed along the circumferential direction of the insulated electrical cable 11. Thus, the adhesive 2 can be provided in a wider area along the circumferential direction of the insulated electrical cable 11 and the performance of the waterproof structure of the molded part-equipped electrical cable 100 can be improved.

The insulation coating 111 may be made of silicone rubber. By employing a strong acid solvent (organic solvent 4), such as dilute sulfuric acid, bonding groups (siloxane bonds) of silicone are cut in the recess 19 of the insulation coating 111. By employing the adhesive 2 containing a silicone-based material or the like, adhesion between the insulation coating 111 and the adhesive 2 can be improved in the recess 19. The above-described combination of the organic solvent 4 and the adhesive 2 enhances the adhesion between the insulation coating 111 and the adhesive 2, particularly in the recess 19, and the flow of the adhesive 2 from the desired position by the injection pressure during the molding of the molded part 3 is suppressed. As a result, the performance of the waterproof structure of the molded part-equipped electrical cable 100 is improved.

Figure 9:
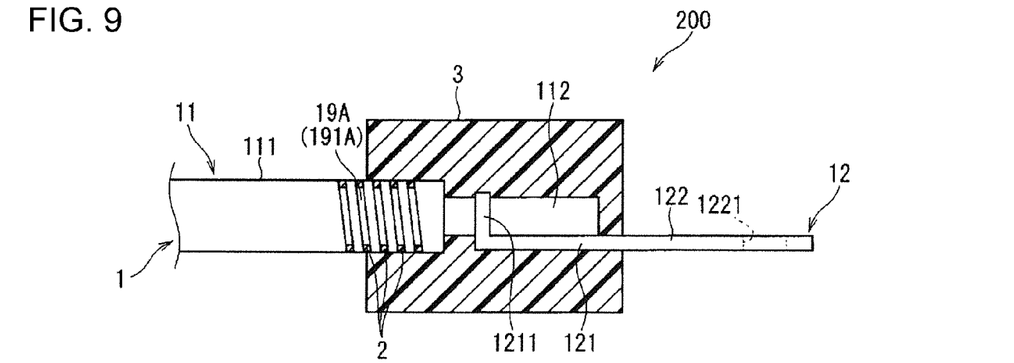
FIG. 9 is a side view partly in section of a molded part-equipped electrical cable according to a second embodiment.

Next, a molded part-equipped electrical cable 200 according to a second embodiment is described with reference to FIG. 9. The molded part-equipped electrical cable 200 includes a recess 19A structured differently than in the first embodiment. FIG. 9 is a side view partly in section of the molded part-equipped electrical cable 200. Note that, in FIG. 9, the same constituent elements as those shown in FIGS. 1 to 8 are denoted by the same reference signs. Points of difference of this embodiment from the first embodiment are described below.

In this embodiment, the molded part-equipped electrical cable 200 includes the recess 19A formed by partially removing an insulation coating 111. In an example shown in FIG. 9, the recess 19A formed on the insulation coating 111 is formed spirally along a longitudinal direction of an insulated electrical cable 11. The recess 19A is formed by removing a part of the insulation coating 111 using a file or the like.

In this embodiment, the recess 19A includes only a first recess 191A formed on the insulation coating 111 along a circumferential direction of the insulated electrical cable 11. Note that it is also conceivable to provide second recesses 192 by roughening a surface of the insulation coating 111 in the first recess 191A after the first recess 191A is formed with a file or the like.

Note that recess 19A may possibly include a plurality of annular groove portions formed side by side along the longitudinal direction of the insulated electrical cable 11 and extending along the circumferential direction of the insulation coating 111. Further, the recess 19A may include streaky cracks or the like formed on the insulation coating 111.

Also in this embodiment, the flow of an adhesive 2 from a desired position by an injection pressure during the molding of a molded part 3 can be suppressed by providing the adhesive 2 in the recess 19A.

The recess 19 may include only the second recesses 192. In this case, the adhesive 2 is provided on the insulation coating 111 to cover the second recesses 192.

Further, the recess 19 may be shaped similar to the recess 19A in the second embodiment by adjusting a dripping amount and the dripping position of the organic solvent 4.

Note that the molded part-equipped electrical cable according to the present invention can also be configured by freely combining the respective embodiments and application examples described above or appropriately modifying or partially omitting the respective embodiments and application examples within the scope of the invention described in each claim.

LIST OF REFERENCE SIGNS

1 terminal-equipped electrical cable
100 molded part-equipped electrical cable
11 insulated electrical cable
111 insulation coating
112 core
12 terminal
19 recess
191 first recess
192 second recess
2 adhesive
3 molded part
4 organic solvent

The invention claimed is:

1. A molded part-equipped electrical cable, comprising:
   a terminal-equipped electrical cable including an insulated electrical cable with a core and an insulation coating covering around the core and a terminal connected to an end part of the insulated electrical cable, a recess being formed on the insulation coating;
   an adhesive provided in the recess of the insulation coating; and
   a molded part configured to cover from a part where the adhesive is provided in the insulation coating of the terminal-equipped electrical cable to a connected part of the insulated electrical cable and the terminal,
   wherein the recess includes a first recess formed on the insulation coating and a plurality of second recesses scattered on a surface of the first recess.

2. The molded part-equipped electrical cable of claim 1, wherein the first recess is formed on the insulation coating along a circumferential direction of the insulated electrical cable.

3. The molded part-equipped electrical cable of claim 2, wherein the insulation coating is made of silicone rubber.

4. The molded part-equipped electrical cable of claim 3, wherein the recess is formed by applying an organic solvent to the insulation coating.

5. The molded part-equipped electrical cable of claim 4, wherein an end of the recess is formed to be located closer to a middle part than an end of the insulation coating in a longitudinal direction of the insulated electrical cable.

6. The molded part-equipped electrical cable of claim 1, wherein the insulation coating is made of silicone rubber.

7. The molded part-equipped electrical cable of claim 1, wherein the recess is formed by applying an organic solvent to the insulation coating.

8. The molded part-equipped electrical cable of claim 1, wherein an end of the recess is formed to be located closer to a middle part than an end of the insulation coating in a longitudinal direction of the insulated electrical cable.

* * * * *